UNITED STATES PATENT OFFICE.

WALTER G. CORDES, OF LONDON, ENGLAND, ASSIGNOR TO THE NON-POISONOUS "STRIKE ANYWHERE" MATCH SYNDICATE, LIMITED, OF SAME PLACE.

MATCH COMPOSITION.

SPECIFICATION forming part of Letters Patent No. 627,393, dated June 20, 1899.

Application filed December 5, 1898. Serial No. 698,352. (No specimens.)

*To all whom it may concern:*

Be it known that I, WALTER GEORGE CORDES, gas-meter tester, a subject of the Queen of Great Britain, residing at Gas Meter Testing Station, Castle street, Southwark, London, England, have invented certain new and useful Improvements in the Manufacture of Matches, of which the following is a specification.

This invention relates to the manufacture of matches without the use of white or yellow phosphorus and which can be struck anywhere; and it consists in providing an improved composition for forming a head on the splint which does not require a second coating or the application of an additional ignition-coating thereto.

According to this invention the following ingredients are employed, the proportions being slightly varied, if found desirable in practice, to suit circumstances: chlorate of potash, two hundred parts; ground glass, one hundred parts; whiting, sixty parts; plaster-of-paris, thirty-five parts; glue, (glue eight parts, water eight parts,) one hundred and thirty parts; mix well with water, thirty parts; a coloring substance, one part.

The above ingredients are mixed thoroughly and passed through the mill twice. To this mixture amorphous red phosphorus is added, fifty parts of the dry amorphous phosphorus being mixed with sufficient water to produce a paste of the consistency of cream. The composition is then mixed again and passed through the mill. The splints (of wood, wax-taper, or other suitable material) are dipped into the mixture in the ordinary manner. The head formed thereby when dried may be struck on any surface, and it ignites readily without spluttering and with little noise.

I claim—

1. A preparation or composition for match-heads consisting of chlorate of potash, ground glass, whiting, plaster-of-paris, glue and water, and amorphous red phosphorus in substantially the proportions specified.

2. A preparation or composition for match-heads, consisting of chlorate of potash, ground glass, whiting, plaster-of-paris, glue and water, a coloring substance, and amorphous red phosphorus, in substantially the proportions specified.

In testimony whereof I have hereunto set my hand in presence of two subscribing witnesses.

WALTER G. CORDES.

Witnesses:
GEORGE C. DOWNING,
FRED. C. HARRIS.